May 12, 1925.  
P. BRÜHL  
GRINDING DEVICE  
Filed Feb. 14, 1924  
1,537,403  
3 Sheets-Sheet 1

May 12, 1925. 1,537,403
P. BRÜHL
GRINDING DEVICE
Filed Feb. 14, 1924 3 Sheets-Sheet 2
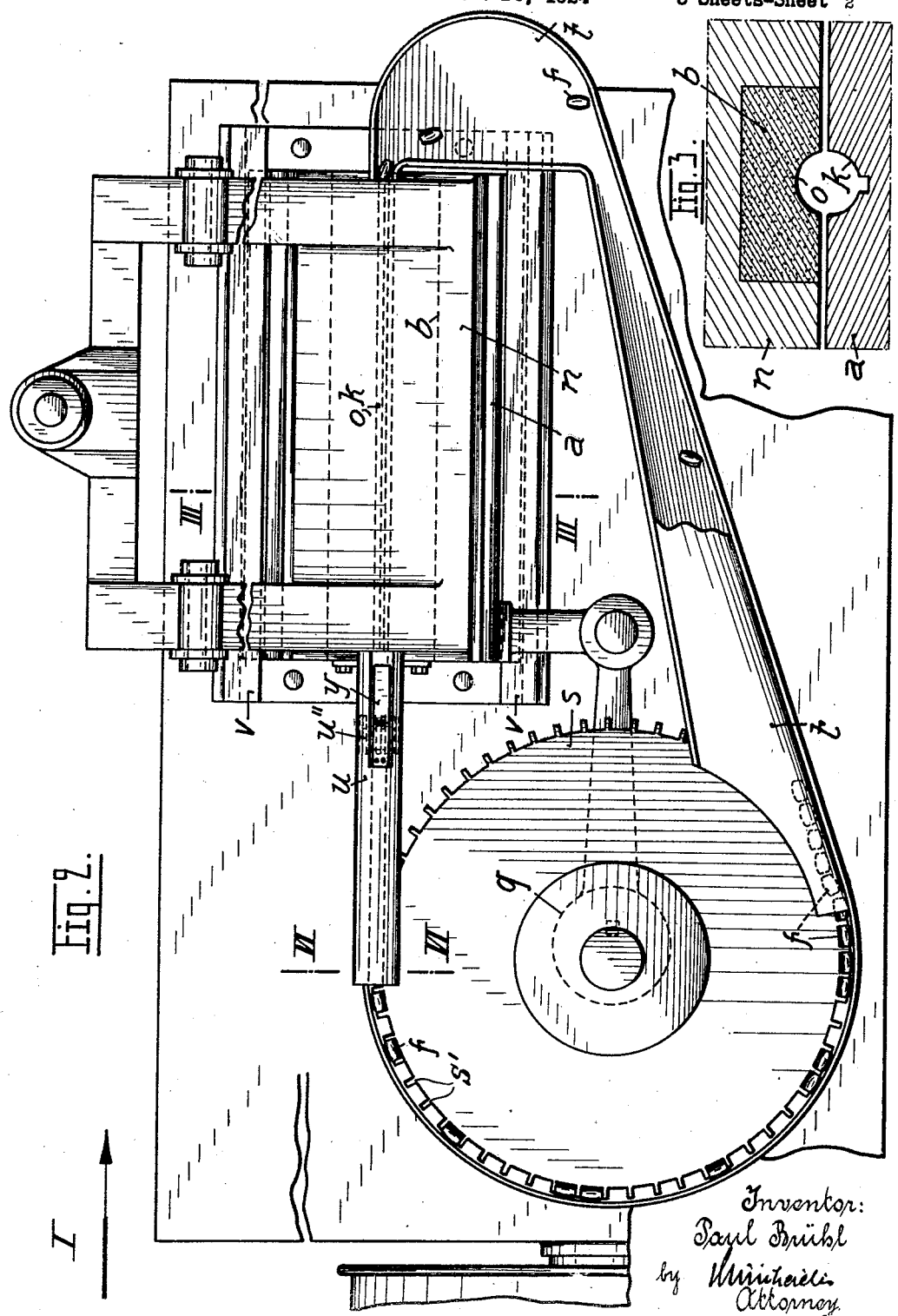

May 12, 1925.

P. BRÜHL

GRINDING DEVICE

Filed Feb. 14, 1924

Inventor:
Paul Brühl
by Minhachi
Attorney.

Patented May 12, 1925.

1,537,403

UNITED STATES PATENT OFFICE.

PAUL BRÜHL, OF DUSSELDORF, GERMANY, ASSIGNOR TO THE FIRM: MASCHINEN-FABRIK "RHEINLAND" A.-G., OF DUSSELDORF, GERMANY.

GRINDING DEVICE.

Application filed February 14, 1924. Serial No. 692,740.

*To all whom it may concern:*

Be it known that I, PAUL BRÜHL, a citizen of Germany, residing at Dusseldorf, Germany, have invented certain new and useful Improvements in Grinding Devices, of which the following is a specification.

My invention refers to grinding devices and more especially to a device of the kind described in my copending application for patent of the United States Serial No. 416300 in which the work pieces to be ground, such as rollers or balls, are caused to pass repeatedly and in a preferably straight path between two non-rotating surfaces pressed against one another, without being allowed to turn or rotate, the work pieces being supported on either side of their axial plane, while being ground.

It is an object of my invention to improve this class of devices with a view to avoiding certain drawbacks connected therewith and which will be explained more fully hereinafter, and in order to improve the quality of the products obtained.

While, in the device according to the prior patent, both the guide block and the grinding block proper are stationary, I have ascertained that better products are obtained if during the grinding operation a permanent reciprocating displacement of one of these parts relatively to the other is allowed to take place in the direction of movement of the work pieces. I have found that the rollers obtained by grinding in a device comprising a stationary guide block and grinding block, while being absolutely circular in cross section throughout, frequently are not truly cylindrical, their circumferential plane being not truly parallel in all points to the middle axis of the cylinder. In quite a number of cases this circumferential plane had a wavy form, although that these curvatures of the lines extending in the circumferential planes of the rollers could only be detected by means of the most sensitive measuring instruments, the deviation from the straight lines amounting only to a few thousandths of a millimeter. This phenomenon is due to the fact that it is practically impossible to make the groove in the guide block absolutely slide. Generally it will show very slight deviations from the straight line, which will result in the production of rollers having the defect mentioned above.

I have now ascertained that, if the guide block is caused to permanently reciprocate relatively to the grinding block in the direction of the guiding groove, these uneven portions of the guiding groove will disappear as the rollers are fed between the guide block and the grinding block, so that absolutely cylindrical rollers will be obtained. Obviously, instead of the guide block the grinding block might be made to reciprocate with the same result. The reciprocating movement need not extend over a large distance.

By causing the guide block to reciprocate, I also obtain the possibility of producing slightly convex or slightly concave rollers, provided that the guide block, instead of being displaced in a straight plane, be caused to move in a path which is curved very slightly only in accordance with a circle concentric with the peripheral line of the rollers to be produced. Inasmuch as the guide block should be caused to move about a centre which is distanced apart from the guide block 20-50 meters, the block obviously cannot be connected with this point, but must be moved to and fro along an auxiliary guide curved according to requirements. If the guide block is caused to reciprocate in a path curved as described, the straight groove provided therein will during the grinding operation be worn off in such manner that it obtains a slightly convex or slightly concave curvature, according to whether the ideal centre point lies below or above the guide, it being assumed in this case that the grinding block is pressed onto the guide block from above.

In the drawings affixed to this specification and forming part thereof, a grinding device embodying my invention is illustrated diagrammatically by way of example.

In the drawings,

Fig. 1 is a side elevation viewed in the direction of the arrow I in Fig. 2, while Fig. 2 is a plan view viewed in the direction of the arrow II in Fig. 1.

Fig. 3 is a partial cross section on the line III—III in Fig. 2.

Figure 1:
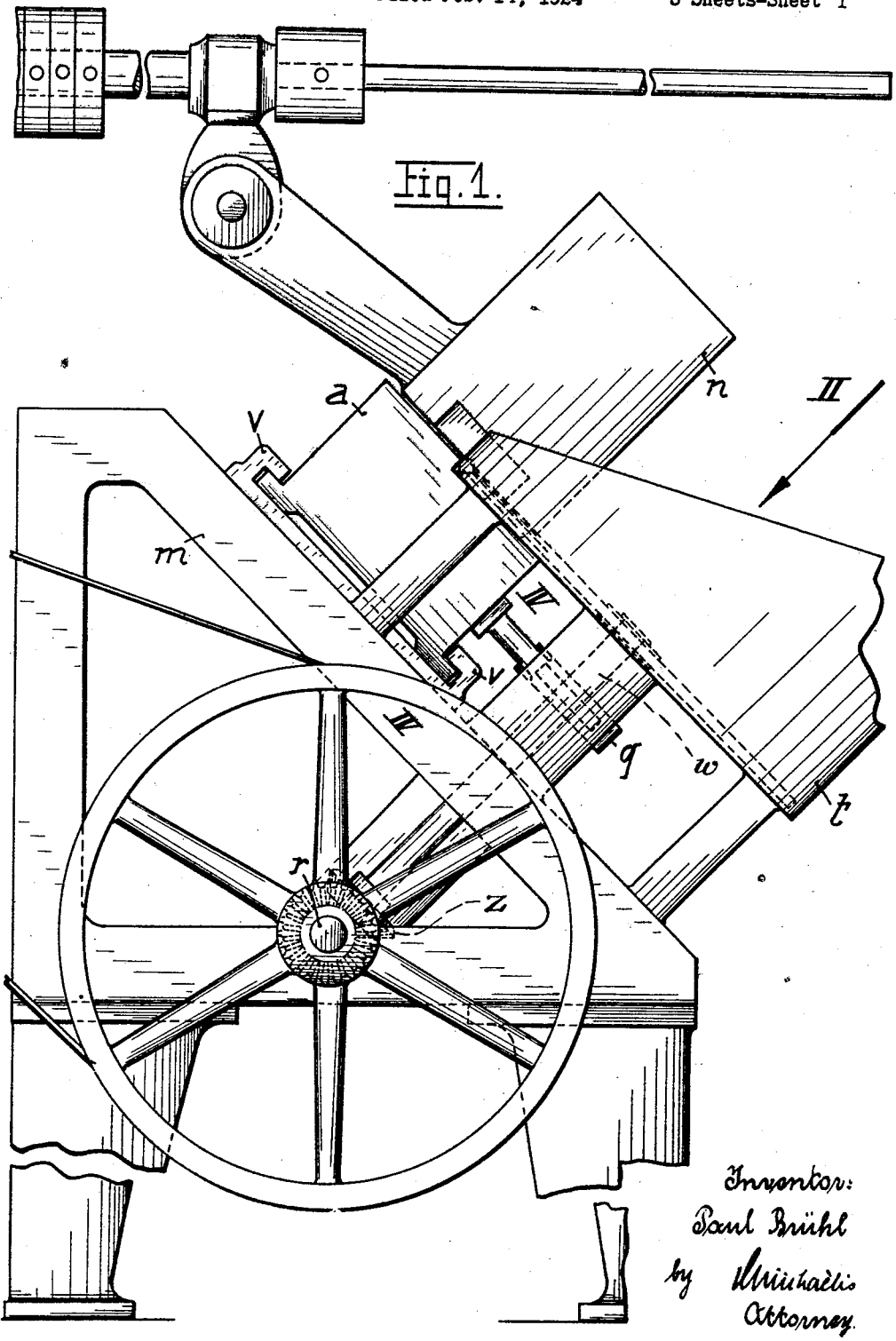

Referring to the drawings, $a$ is the guide block preferably consisting of cast iron and having the cross section shown in Fig. 3. This block is supported on the machine bed $m$ at an angle of about 45° to the horizontal. $b$ is the grinding block pressed onto the upper surface of the guide block, this grinding block in the present instance consisting of grinding material and being mounted on a frame $n$. The guide block $a$ is provided with a guide groove $k$ of the form shown in Fig. 3. This groove may, however, also be replaced by a groove of triangular section. The grinding block $b$ is provided with a semi-circular groove $o$ which is either gradually worked into the block or can be provided therein from the beginning. The guide block is arranged on the machine bed $m$ for reciprocation in the direction of the arrow $p$ in Fig. 4, being guided between guides $v$ and actuated by suitable means, such as an eccentric gear $q$ driven from the machine shaft $r$ by means of a cog wheel gearing $z$. On the main shaft $r$ there is fixed a fly wheel. On the intermediate shaft $w$ there is mounted a disc $s$, being provided on its circumference with teeth $s'$, the gaps between these teeth being large enough to house each one of the roller blanks $f$ to be ground, these blanks accumulating at the lower end of an inclined guide funnel $t$, after having been expelled from between the guide and grinding blocks. The toothed disc $s$ thus carries the roller blanks along in its rotation and delivers them to a tubular guide $u$ which is secured to the stationary frame $n$ and located in front of the entrance of the grinding and guiding grooves, this tubular guide being shaped at its bottom in accordance with the groove $k$ provided in the guide block so that the roller blanks $f$ are guided on both sides in the guide $u$.

As the guide block $a$ reciprocates in the direction of feed of the roller blanks, it alternately moves away from and towards the tubular guide $u$. In order to prevent a gap from forming between the guide tube and the entrance to the guide block groove, a portion $u'$ of the lower part of the guide tube $u$ is separated from the tube and fixed to the guide block $a$, the free edges of the portion $u'$ as well as the tube $u$ being formed of tongues $u''$ separated by gaps into which the tongues of the adjoining part extend so that the roller blanks are always safely guided, inasmuch as the tongues of one part never completely withdraw from the gaps in the other part. In order to prevent the roller blanks from striking the upper edge of the groove provided in the grinding block, if fed forward with high velocity, a leaf spring $y$ is provided at the end of the guide tube $u$ which presses the roller blanks down as they are about to enter between the grooves $k$ and $o$. Obviously, one blank forces the one preceding it forward in the grooves, the upper half of each blank being ground in contact with the grinding groove $o$ and, on being ejected from between the grooves as shown on the right hand side of Fig. 2, the rollers drop into the inclined guide funnel $t$ and are taken up once more by the disc $s$, having in the meantime assumed a different position. This sequence of operations is carried on until all the blanks are ground to true shape.

Figure 4:
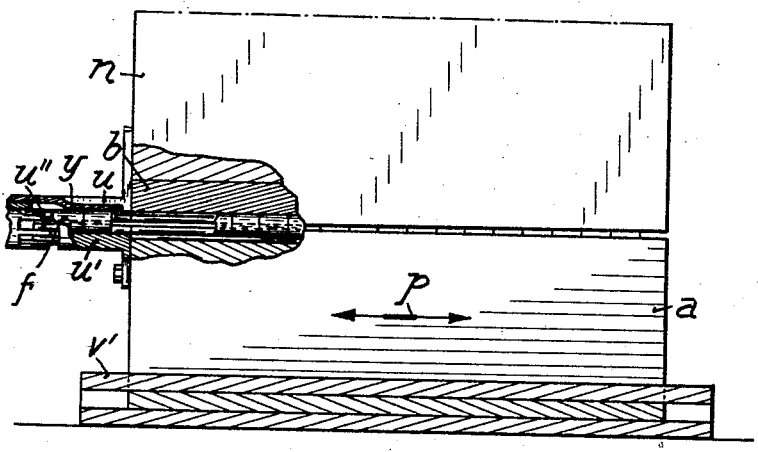
Fig. 4 is partly a section on line IV—IV of Fig. 1 and partly a longitudinal section of the tubular guide for the blanks, the front walls of the frame n and the guide block a being partly broken away, this figure showing the guide block moving in a straight line for grinding straight rollers.

In the modification shown in Fig. 4 the guide members $v'$ are assumed as being truly plane, thereby warranting an absolutely straight reciprocating movement of the guide block $a$. The extent of this movement need only be very small and will, as a rule, not exceed 20–50 millimeters.

Figure 5:
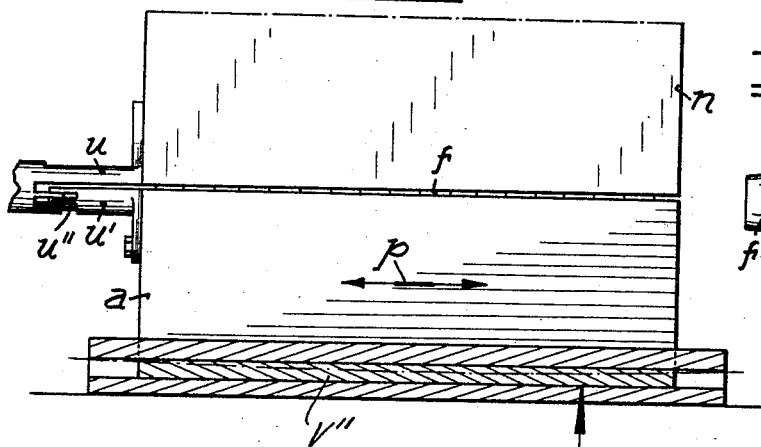
Fig. 5 is also a section on line IV—IV of Fig. 1, in which, however, no parts are broken away, this figure showing a block moving in a circular pass for grinding convex rollers.
Figure 5A:
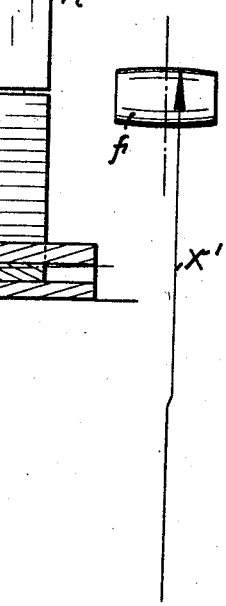
Fig. 5a illustrates a roller such as can be produced with the aid of a device shown in Fig. 5.
Figure 6:
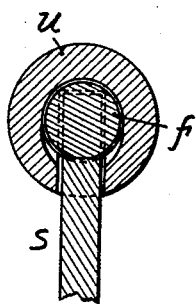
Fig. 6 is a section of a detail drawn to a larger scale on line VI—VI of Fig. 2.

In the modification shown in Fig. 5, the guide members $v''$ for the guide block $a$ are slightly curved for grinding the roller blanks to the convex shape illustrated in Fig. 5a. The radius $x$ of the guides $v'$ is equal to the radius $x'$ to which the rollers are curved, minus the depth of the block $a$. Between the guides $v''$ the guide block $a$ is caused to oscillate about an ideal centre point distanced very far apart and in consequence thereof the approximately cylindrical roller blanks fed into the machine are ground to the shape of slightly convex rollers in which the difference between the medium diameter and the end diameters is, as a rule, equal to 0.005 millimeters. During the grinding operation the guide groove $k$, provided in the guide block $a$ which at first is straight, is worn off and will assume the shape shown in Fig. 5 in dot and dash lines.

If it is desired to produce rollers having a circumferential line of much smaller radius, I prefer providing in the guide and grinding blocks grooves $k$ and $o$ which are correspondingly curved from the beginning.

If the centre point for the guides $v''$ in Fig. 5 is assumed above the device, rollers with slightly concave circumference will be obtained.

Obviously, not only one of the blocks $a$ and $b$, but both of them might be made to reciprocate without any change in the result.

I wish it to be understood that I do not desire to be limited to the exact details of construction shown and described, for obvious modifications will occur to a person skilled in the art.

I claim:—

1. Grinding device for rollers, balls and the like comprising in combination a grooved grinding means, a grooved guide block adapted to cooperate with and to reciprocate relatively to said grinding means in the direction of the groove and means for feeding work pieces into said grooves.

2. Grinding device for rollers, balls and the like comprising in combination a grooved grinding means, a grooved guide block adapted to cooperate with and to reciprocate relatively to said grinding means in the direction of the groove and in a path which is slightly curved in the plane intersecting both grooves and means for feeding work pieces into said grooves.

3. Grinding device for rollers, balls and the like comprising in combination a grooved grinding means, a grooved guide block adapted to cooperate with and to reciprocate relatively to said grinding means in the direction of the groove, means for feeding work pieces into said grooves and a guide member at the entrance of said grooves.

4. Grinding device for rollers, balls and the like comprising in combination a grooved grinding means, a grooved guide block adapted to cooperate with and to reciprocate relatively to said grinding means in the direction of the groove, means for feeding work pieces into said grooves, a guide member at the entrance of said grooves and means associated with said guide member for exerting pressure on said work pieces in the direction towards the bottom of the groove in said guide block.

5. Grinding device for rollers, balls and the like comprising in combination a grooved grinding means, a grooved guide block adapted to cooperate with and to reciprocate relatively to said grinding means in the direction of the groove, means for feeding work pieces into said grooves and two tubular guide members in front of said grooves, one of said members being attached to said guide blocks, tongues extending from said latter member into notches at the adjoining end of the other member.

6. Grinding device for rollers, balls and the like comprising in combination a grooved grinding means, a grooved guide block adapted to cooperate with and to reciprocate relatively to said grinding means in the direction of the groove, work piece guiding means extending outwardly in a closed curve from one to the other end of said grooves and a circumferentially notched rotary disc adapted to cooperate with said guiding means in front of said grooves.

In testimony whereof I affix my signature.

PAUL BRÜHL.